Dec. 9, 1924.                                                    1,518,939
H. SCHLAICH
COMPENSATED DISTANCE TYPE THERMOMETER
Filed April 28, 1919           2 Sheets-Sheet 1
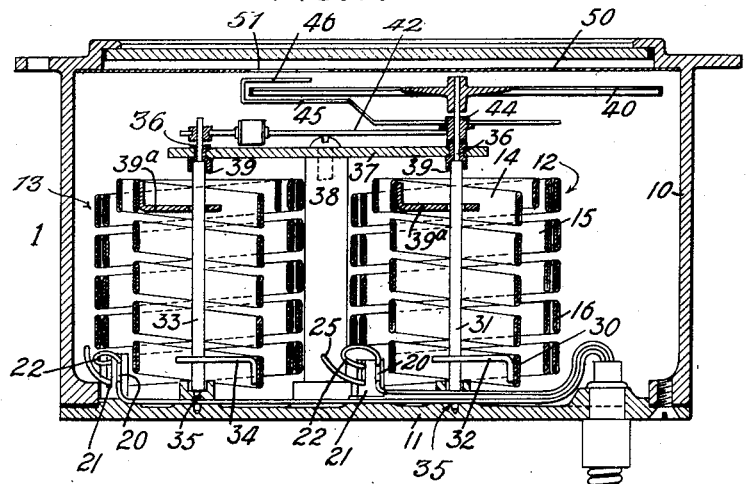
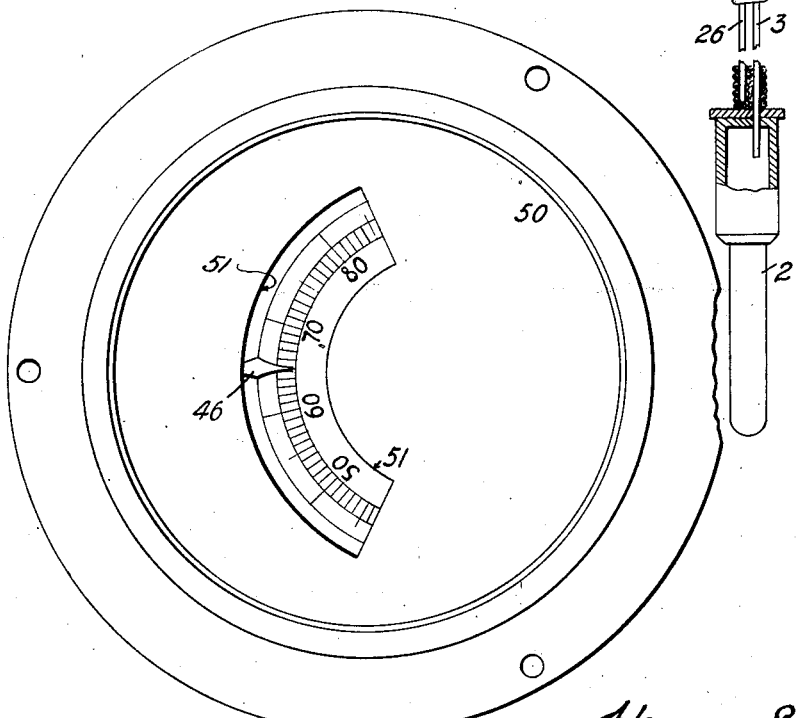
INVENTOR
Herman Schlaich
BY
Edmund Quincy Moses
HIS ATTORNEY Dec. 9, 1924.
H. SCHLAICH
COMPENSATED DISTANCE TYPE THERMOMETER
Filed April 28, 1919  2 Sheets-Sheet 2
1,518,939
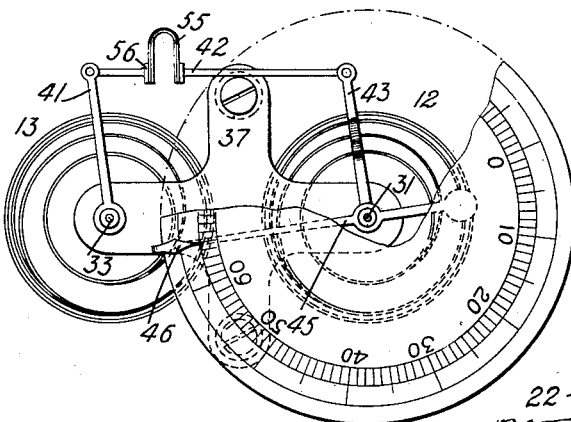
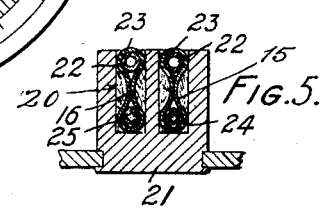
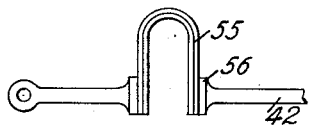
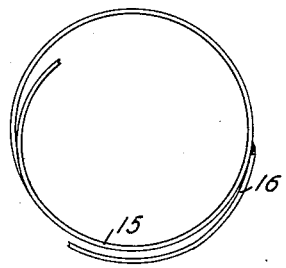
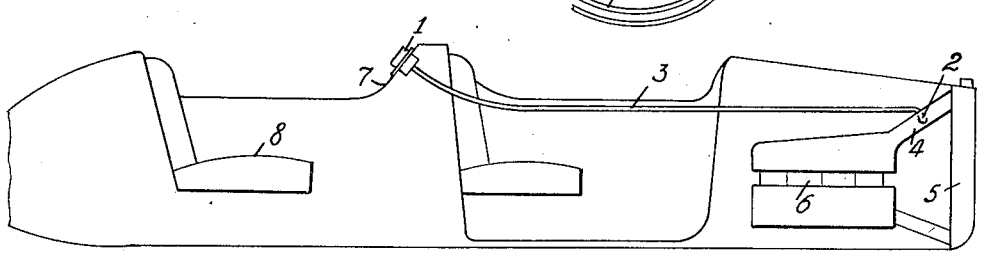
INVENTOR
Herman Schlaich
BY Edmund ...
HIS ATTORNEY Patented Dec. 9, 1924.

1,518,939

UNITED STATES PATENT OFFICE.

HERMAN SCHLAICH, OF BROOKLYN, NEW YORK.

COMPENSATED DISTANCE-TYPE THERMOMETER.

Application filed April 28, 1919. Serial No. 293,266.

*To all whom it may concern:*

Be it known that I, HERMAN SCHLAICH, a citizen of Germany, having declared my intention of becoming a citizen of the United States, residing in the borough of Brooklyn, city of New York, county of Kings, State of New York, have invented certain new and useful Improvements in Compensated Distance-Type Thermometers, of which the following is a specification.

This invention relates to thermometers of what are known as the "distance type", in which temperature conditions at a given location are indicated or registered by an indicating instrument or gage situated at a more or less remote point. This is accomplished in the type of instrument to which the present invention particularly relates, by the employment of a gage or indicating instrument provided with a pressure sensitive element such as a Bourdon spring which is connected by a capillary tube with a bulb located at the point where the temperature is to be measured; the Bourdon spring, capillary tube and bulb being filled with a temperature sensitive substance, preferably an expansible liquid. Such instruments may be constructed to possess a high degree of accuracy, but there is always a certain error, due to temperature changes to which the capillary tube connecting the gage and bulb may be subjected. This error will be larger in instances where the connecting tube is long and is subjected to widely variable temperature conditions, such, for instance, as in the case of instruments utilized to indicate the operating thermal conditions of an aeroplane engine where the indicating instrument is frequently located many feet from the engine and where the connecting tube may be subjected to large temperature variations due to the extremes of atmospheric conditions encountered.

The present invention provides for the complete compensation for any errors due to temperature variations to which the capillary tube may be subjected, this result being accomplished by the use of two pressure-responsive members balanced against each other or acting in opposition, one of which is connected to the capillary tube leading to the bulb and the other of which is connected to a blind tube paralleling the main tube. In this way the effect produced by any expansion or contraction of the fluid in the main capillary is counteracted by the opposite action produced by the similar expansion of the fluid in the blind capillary. Means are provided for coordinating the actions of the two pressure-responsive elements of the gage so as to cause the gage to give a correct indication capable of being directly read therefrom at all times. Means are also preferably provided for compensating for differences in characteristics of the pressure-sensitive elements and capillary tubes so as to overcome any inaccuracies which might result from these conditions due either to variations in temperature to which the capillary tubes are subjected, or to local temperature changes occurring at the gage or instrument head itself.

The invention further relates to an improved construction of Bourdon spring which may be employed with the other features of the invention or independently thereof, and which provides an increased volume for the spring without increasing proportionately the amount of movement produced thereby and without increaing the requirements as to strength or thickness of the walls. By thus increasing the volume of the spring a larger bulb may be employed and a larger volume of expansible fluid utilized, thereby reducing proportionately any errors due to expansion of the fluid contained in the capillaries.

The nature of my invention and the manner in which the different results referred to are obtained will be best understood from the detailed description of one embodiment of the invention which I have chosen to illustrate the same in the best form now known to me.

In the accompanying drawings, Figure 1 is a transverse sectional view through an instrument embodying one form of the invention;

Figure 2 is a face view of the instrument shown in Figure 1;

Figure 3 is a plan view of the operative parts of the instrument, a part of the rotatable dial being broken away;

Figure 4 is a detail side elevation of one of the pointer-operating levers showing how the same may be adjusted in length by bending;

Figure 5 is a detail sectional view through one of the supporting studs for the Bourdon springs;

Figure 6 is an enlarged plan view of the bimetallic compensating link;

Figure 7 is a plan view of a part of one of the Bourdon coils;

Figure 8 is a diagrammatic view showing the fuselage of an aeroplane with the motor therein, and showing one application of the instrument as employed for indicating to the operator the thermal condition of the motor.

Referring to the drawings in detail, the numeral 1 indicates the instrument head which contains the pressure-sensitive indicating or registering means which are operatively connected to the temperature-responsive element or bulb 2, located at the point where the temperature is to be measured. The pressure-sensitive instrumentalities in the instrument head are connected to the bulb by a capillary tube 3 which transmits changes in volume or pressure of the fluid within the bulb 2 to the instrument. As illustrated for instance in Figure 8, the bulb 2 may be located in the return pipe 4 leading to the radiator 5, or other suitable part of the cooling system of the aeroplane engine 6. In accordance with the patent to Boyce No. 1,206,782, while the instrument or gage 1 is located in position for observation by the pilot, as upon the instrument board 7 in front of the pilot's seat 8. The distance between the instrument and the bulb may be considerable and the tube 3 may be subjected to greatly varying temperature conditions, a part of it being located, for instance, under the engine hood where it is subjected to relatively high temperature while another part of it may be exposed to the temperature of the outer air which may be very low.

Referring particularly to Figures 1 and 3, in the form of instrument shown the instrument head comprises a casing 10 having a back plate 11 on which are supported two pressure-sensitive elements which are made as nearly indentical as possible, and which in the construction illustrated, comprise the two Bourdon springs 12 and 13. These springs may be of any suitable construction, such for instance, as that shown in my application for patent Serial No. 218,801, filed February 23, 1918. Preferably, however, I employ the improved construction illustrated, in which the main Bourdon tube of each spring is wound from the rear forwardly in an inner helix 14, and then backwardly upon itself in an outer helix 15, the rear end of the outer helix being mounted on a fixed support on the back plate. In order to increase the volumetric capacity of the spring, a second Bourdon tube 16 is wound about the outer helix of the main tube, this second tube also having its rear end mounted on the back plate and having its opposite end sealed and firmly attached to the main tube preferably near the outer end of the outer helix 15, as shown most clearly in Figure 7. The spring coils 15 and 16 may be supported at their fixed ends in any suitable manner, preferably by being mounted in notches 20 in studs 21 attached to the back plate, and their interiors are placed in free communication in any suitable manner as by means of a section of small tubing 22 having one of its ends inserted in an enlargement 23 of each of the spring coils, as shown in Figures 1 and 5. The Bourdon spring 12 is connected with the end of the capillary tube 3 which communicates with the bulb 2, the connection being preferably established by introducing the end of the tube 3 into an enlargement 24 of the end of the spring coil 15, as shown in Figure 5. A short filling tube 25 may be introduced into a corresponding enlargement of the end of the auxiliary coil 16 through which the filling fluid may be introduced into the Bourdon coil, capillary tube and bulb. The second Bourdon spring 13 is preferably constructed exactly like the first Bourdon spring. This spring, however, does not communicate with the capillary 3 or the bulb 2, but has opening into it the end of a blind capillary tube 26, which is as nearly identical to the capillary tube 3 as possible, and which extends parallel with the capillary tube 3 to a position adjacent to the bulb 2 where its end is sealed. The capillary tubes 3 and 26 are preferably enclosed outside of the casing 10 in a suitable flexible tubular casing or armour 27 which protects them and also holds them together and insures their subjection to the same temperature conditions throughout their length.

In the preferred form of my invention I utilize an expansible liquid such as alcohol, glycerine or mercury, preferably the former, which completely fills all parts of both Bourdon coils, capillary tubes and the bulb 2, and which is preferably forced in under considerable initial pressure so as to initially stress the Bourdon coils in the manner and for the purposes set forth in my application for patent, Serial No. 218,801. The manner of mounting the ends of the Bourdon springs in a slotted stud and of securing the capillary tubes in enlargements thereof and the use of a filling tube also secured in an enlargement of the end of the Bourdon spring as above described, are not claimed herein, as the same form a part of the subject matter of an application for patent filed by me April 28, 1919, Serial No. 293,265.

In accordance with the well understood operation of Bourdon coils, changes in the temperature of the bulb 2 causing a variation of the volume of the liquid contained therein will cause more or less of the liquid to be forced through the capillary tube 3 into the Bourdon spring 12, which will cause such spring to unwind more or less, thereby producing a rotary movement of the free end 30 of the inner helix 14 of the spring 12 about the axis of the spring. Upon the subjection of the tubes 3 and 26 to temperature changes, an expansion or contraction of the liquid contained in the capillary tubes will be produced which will cause a relatively slight movement of the free ends of both the springs 12 and 13, this movement being similar in the case of the two springs. These movements of the springs actuate suitable mechanism by which the indicating or registering devices of the instrument are operated to produce a corrected indication of the temperature changes to which the bulb is subjected. In the construction illustrated, an arbor 31 is mounted axially with respect to the spring 12 and is connected with the free end 30 of the spring by means of a lever 32, while the free end of the spring 13 is connected to a similarly mounted arbor 33 by means of the lever 34. Each of the arbors is journalled at one end in a bearing 35 in the back plate and at its other end in a bearing 36 mounted in a plate 37 supported by posts 38 projecting from the back plate. The bearings are preferably constructed in the form described and claimed in my application for patent Serial No. 293,265 filed April 28, 1919, each of the bearings having a bore of small diameter adapted to fit a journal portion of reduced diameter projecting from the end of the arbor, and also having a bore 39 of larger diameter adapted to receive the end portion of the arbor and provide an emergency support therefor in the case of the excessive wear or breakage of the reduced journal portion, but of sufficient size to provide a clearance between the inner walls of the bore and the surface of the arbor so as to normally avoid friction at this point. A steadying arm 39ª loosely engaging the corresponding arbor, is preferably fastened to one of the inner convolutions of each spring near the upper part thereof so as to restrain vibration of the spring. The extremity of the arbor 31 has fixed thereon the rotatable dial 40 which is rotated by the arbor in accordance with the movements imparted thereto by the Bourdon spring 12 which is actuated primarily by the expansion and contraction of the liquid in the bulb 2, due to the temperatures to which the latter is subjected. The position of the dial 40 will therefore indicate generally the temperature of the bulb 2. The arbor 33 has fixed to its upper extremity a lever 41 (see Figure 3), which is connected by means of a link 42 with a lever 43 attached to a sleeve 44 (see Figure 1) journalled on the upper part of the arbor 31. This sleeve has fixed to it an index arm 45 having a pointer portion 46 bent over the edge of the dial 40 as shown in Figure 2. This pointer, it will be seen, receives its movement through the mechanism described, from the spring 13 which is actuated by the expansion or contraction of the liquid in the blind capillary 26. Changes in temperature to which the tubes 3 and 26 are subjected, causing expansion or contraction of the columns of fluid in such tubes, will influence both of the springs 12 and 13 to substantially the same extent thus producing corresponding movements of the dial plate 40 and pointer 46 which will accordingly not produce any change in the scale number on the dial plate opposite to the pointer. Both the scale number and pointer will move together so that the indication will be the same. In other words, there will be no error in the reading due to the changes in temperature to which the capillaries are subjected. On the other hand, any change of temperature of the bulb 2 will cause an expansion or contraction of the liquid therein, which will actuate the spring 12 but will in no way affect the spring 13, thus producing a relative movement between the dial and pointer proportionate to the temperature change at the bulb which will thus cause the instrument to indicate correctly the desired temperature.

The instrument is preferably provided with a front plate 50 having an aperture 51 therein of such length as to take care of any variation in the position of the pointer 46 and to permit the observation of a corresponding part of the dial adjacent thereto. The actual movement of the pointer 46 will usually be quite limited, while the dial may rotate through a complete or the greater part of a revolution within the limits of indication of the instrument.

If the capillary tubes 3 and 26 are identical in volume and the Bourdon springs 12 and 13 are identical in volume and characteristics, the instrument described will be fully compensated and will be accurate under all conditions. Changes in temperature to which the instrument head itself is subjected, as well as changes in temperature affecting the capillary tubes, will produce identical movements of the two springs which will in no way affect the relative positions of the pointer and dial. In practice, however, it is not possible to secure capillary tubing which is absolutely uniform in size nor is it possible to construct Bourdon springs of identical volume and properties. Variation of volume between the two capillaries 3 and 26 will cause unequal movements of the two springs to result when the temperature of the capillaries changes and in order to overcome any error resulting from this I provide for the relative adjustment in length of the lever arms 41 and 43. These lever arms may be made adjustable in any suitable manner as, for instance, by making them of thin pliable metal which may be bent or buckled slightly as shown in Figure 4, thereby reducing the length of the arm. By adjusting the length of the lever arms the instrument may be corrected for errors due to conditions away from the instrument head. For example, if upon calibrating tests it is found that the movement of the dial is more extensive than it should be with respect to the pointer, then the rate of movement of the pointer may be increased by shortening the lever arm 43, whereas if the dial is found to lag the movement of the pointer may be reduced by shortening the lever arm 41. In this way the ratio of movement between the pointer and dial may be exactly adjusted so as to compensate for any error due to changes in temperature to which the capillaries are subjected.

Another source of possible error above referred to resides in the lack of complete uniformity between the Bourdon springs, which results in different rates of movement of the pointer and dial due to local temperature changes within the instrument casing itself which cause expansion or contraction of the liquid in the springs. In order to correct for such differences I introduces a temperature-sensitive element into the mechanism of the instrument head, preferably into the operative connections between the pointer and its Bourdon spring, though obviously the compensating element may be introduced elsewhere. In the construction illustrated I make the link 42 connecting the levers 41 and 43 in two parts joined by the U-shaped bimetallic strip 55. If local temperature changes within the instrument casing are found to cause a greater movement of the spring 12 than of the spring 13, then I utilize a strip 55 of such characteristics that it will expand upon a rise of temperature so as to lengthen the link 42 and thereby increase the movement of the pointer, enabling it to keep up with the movement of the dial 40, caused by the local temperature change. On the other hand, if the spring 13 is found to expand more rapidly than the spring 12 due to a local temperature change, then I use a bimetallic strip 55 which will contract on a rise of temperature so as to reduce the movement of the pointer. The degree of movement of the pointer may also be controlled by selecting bimetallic links of the proper length of arm. The bimetallic member may be secured in position in any suitable manner as by being soldered to the heads 56 on the sections of the link 42, it being a simple matter to substitute one bimetallic member for another until the correct result is obtained and the instrument perfectly calibrated.

From the foregoing it will be seen that I have provided an instrument which is fully compensated for all errors due to temperature conditions at any point either along the capillary or at the instrument head itself, and that this result has been accomplished in an extremely durable and effective manner.

In an instrument such as that described in which the Bourdon springs, capillaries and bulb are filled with an expansible liquid which is substantially incompressible, the instrument will furthermore be free from effects of external pressure variations, and therefore eminently fitted for aeronautic work. An instrument such as described is also substantially "dead beat" and free from the effects of vibration. By the introduction of the liquid into the system under pressure so as to produce a suitable initial stress in the Bourdon springs, the instrument is also made capable of registering through a considerable range of temperature variation and will correctly indicate low temperatures as well as high.

The Bourdon spring construction described in which two coil sections connected "in parallel" are operated as a unit is advantageous in reducing the percentage of possible error in any instrument of the character under consideration utilizing a Bourdon spring, whether such instrument is a dual spring instrument such as here particularly described, or of the single spring type such as shown in my application Serial No. 218,801, filed February 23, 1918. The effect of the additional coil is to increase the capacity of the spring as a whole without otherwise substantially changing its characteristics. Increasing the capacity of the spring in turn permits the use of a larger bulb and of more of the expansible liquid, without, however, necessitating the use of a larger capillary tube, and thereby decreases the percentage of the total liquid of the system contained within the capillary tube. This cuts down the percentage of error which temperature changes in the capillary may be responsible for. Increasing the volume of the spring by adding the additional coil section arranged in parallel with the primary coil section is superior to attempting to increase the volume of the spring by merely increasing its length, as the latter will also increase the rate and amount of movement of the free end of the spring and of any dial or pointer operated thereby. On the other hand attempts to increase the volume of the spring by increasing its cross section are objectionable as any increase in cross section greatly increases the effect of the internal pressure, thereby necessitating the use of heavier metal in the coil walls and greatly magnifying the difficulties of manufacture.

While I have illustrated and described in detail an instrument construction embodying my invention in the best form now known to me, it is to be understood that this construction is merely illustrative of the invention and that changes may be made therein. I therefore do not intend to limit myself to the specific construction set forth, but intend to cover my invention broadly in whatever form its principle may be embodied.

Having thus described my invention, I claim:—

1. In an instrument of the character described the combination of duplicate pressure-sensitive elements, means actuated by the joint operation of said elements for producing a reading compensated for temperature errors, and means for correcting said reading for errors due to inequalities in the action of said pressure-sensitive elements when subjected to local temperature changes.

2. In an instrument of the character described the combination of duplicate pressure-sensitive elements, a bulb located at a distant point, a tube connecting said bulb with one of said elements, a similar tube paralleling said first mentioned tube and connected at one end to the other element and having its other end closed, said tubes being filled with a fluid, means controlled by the joint action of said elements for giving a reading of temperatures to which said bulb is subjected compensated for temperatures between the bulb and sensitive elements, and means for correcting the reading of the instrument for errors due to inequalities in the action of said pressure-sensitive elements.

3. In an instrument of the character described the combination of duplicate pressure-sensitive elements, a bulb located at a distant point, a tube connecting said bulb with one of said elements, a similar tube paralleling said first mentioned tube and connected at one end to the other element and having its other end closed, said tubes being filled with a fluid, means controlled by the joint action of said elements for giving a reading of temperatures to which said bulb is subjected compensated for temperatures between the bulb and sensitive elements, and means for correcting the reading of the instrument for errors due to inequalities in the action of said pressure-sensitive elements produced by temperature conditions affecting said parallel tubes at a distance from the instrument.

4. In an instrument of the character described the combination of duplicate pressure-sensitive elements, a bulb located at a distant point, a tube connecting said bulb with one of said elements, a similar tube paralleling said first mentioned tube and connected at one end to the other element and having its other end closed, said tubes being filled with a fluid, means controlled by the joint action of said elements for giving a reading of temperatures to which said bulb is subjected compensated for temperatures between the bulb and sensitive elements, and means for correcting the reading of the instrument for errors due to local temperature changes in proximity to said pressure-sensitive elements.

5. In an instrument for measuring temperature, a pair of movable coacting temperature-indicating members, a plurality of pressure sensitive devices, and means for each of said devices for respectively actuating different temperature indicating members.

6. In an instrument for measuring temperature, a pair of movable coacting temperature-indicating members, a pair of pressure sensitive devices, and means interposed between said devices and said indicating members for rendering said members respectively responsive to different ones of said devices, said means being arranged to cause an equal movement of each of said members in response to an equal change in the pressure sensitive means, so as to compensate for conditions equally affecting both of said pressure sensitive devices.

7. In an instrument for measuring temperature at a remote point, a pair of movable co-acting temperature indicating members, means responsive to temperature variations at said point and between said instrument and said point for actuating one of said indicating members, and means responsive to temperature variations between said instrument and said point for actuating the other of said indicating members, said temperature responsive means being so proportioned and arranged that the temperature indicating members will indicate the temperature at said point.

8. An instrument for measuring temperature at a remote point, comprising an index member, a dial member, means comprising a Bourdon spring for actuating one of said members in response to temperature variations at said point and between said point and instrument and means comprising a Bourdon spring for actuating the other member to compensate for the effect of temperature variations between said instrument and said point.

9. In an instrument of the character described the combination of two pressure-sensitive elements, a bulb, a capillary tube connecting one of said elements with the bulb, a second capillary tube paralleling said first capillary tube sealed at its outer end and connected at its opposite end to said second pressure-sensitive element, said tubes and bulb being filled with a fluid. a movable dial member operatively connected with one of said pressure-sensitive elements, and a movable index member operatively connected with the other of said pressure-sensitive elements and adapted to cooperate with said dial member to give a compensated reading.

10. In an instrument of the character described the combination of two Bourdon springs, a bulb, a capillary tube connecting one of said springs with the bulb, a second capillary tube paralleling said first capillary tube, sealed at its outer end and connected at its opposite end to said second spring, a dial operatively connected with one of said springs, an index member operatively connected with the other spring, and adapted to cooperate with said dial member, and means for varying the ratio of movement between said dial and index member produced by the action of the Bourdon springs thereon.

11. In an instrument of the character described the combination of two Bourdon springs, a bulb, a capillary tube connecting one of said springs with said bulb, a second capillary tube paralleling said first capillary tube, sealed at its outer end and connected at its opposite end to said second spring, a dial operatively connected with one of said springs, an index member operatively connected with the other spring and adapted to cooperate with said dial member, and temperature responsive means independent of the springs for effecting a corrective movement between the index member and dial member.

12. In an instrument of the character described the combination of two Bourdon springs, a bulb adapted to be located at a distance therefrom, a capillary tube connecting one of said springs with said bulb, a second capillary tube connected with the second spring and paralleling said first capillary tube and extending into proximity to said bulb but sealed at its outer end, a movable dial member and a movable index member, means for driving one of said members from one of said Bourdon springs and means for driving the second of said members from the other of said Bourdon springs, said last mentioned means including means for varying the movement ratio between said spring and said member.

13. In an instrument of the character described the combination of two Bourdon springs, a bulb adapted to be located at a distance therefrom, a capillary tube connecting one of said springs with said bulb, a second capillary tube connected with the second spring and paralleling said first capillary tube and extending into proximity to said bulb but sealed at its outer end, a movable dial member and a movable index member, means for driving one of said members from one of said Bourdon springs, and means for driving the second of said members from the other of said Bourdon springs, said last named means including a lever of adjustable length by which the movement ratio between said member and said spring may be varied.

14. In an instrument of the character described the combinaton of two Bourdon springs, a bulb adapted to be located at a distance therefrom, a capillary tube connecting one of said springs with said bulb, a second capillary tube connected with the second spring and paralleling said first capillary tube and extending into proximity to said bulb but sealed at its outer end, a movable dial member and a movable index member, means for driving one of said members from one of said Bourdon springs and means for driving the second of said members from the other of said Bourdon springs, said last named means including a temperature-sensitive element adapted to change the relation between said spring and the member driven thereby when subjected to temperature variations.

15. In an instrument of the character described the combination of two Bourdon springs, a bulb adapted to be located at a distance therefrom, a capillary tube connecting one of said springs with said bulb, a second capillary tube connected with the second spring and paralleling said first capillary tube and extending into proximity to said bulb but sealed at its outer end, a movable dial member and a movable index member, means for driving one of said members from one of said Bourdon springs, and means for driving the second of said members from the other of said Bourdon springs said last named means including a bimetallic element adapted to change the relation between said spring and the member driven thereby when subjected to temperature changes.

16. In an instrument of the character described the combination of two Bourdon springs, a bulb adapted to be located at a distance therefrom, a capillary tube connecting one of said springs with said bulb, a second capillary tube connected with the second spring and paralleling said first capillary tube and extending into proximity to said bulb but sealed at its outer end, a movable dial member and a movable index member, means for driving one of said members from one of said Bourdon springs, and means for driving the second of said members from the other of said Bourdon springs, said last named means including a two-part link, the sections of which are united by a U-shaped bimetallic element adapted when subjected to temperature changes to vary the length of said link.

17. In an instrument of the character described the combination of two Bourdon springs, a bulb adapted to be located at a distance therefrom, a capillary tube connecting one of said springs with said bulb, a second capillary tube connected with the second spring and paralleling said first capillary tube and extending into proximity to said bulb but sealed at its outer end, a movable dial member and a movable index member, means for driving one of said members from one of said Bourdon springs, and means for driving the second of said members from the other of said Bourdon springs, said last named means including a link of variable length and a lever arm of variable length.

18. In an instrument of the character described, the combination of a casing, duplicate Bourdon springs therein, a bulb adapted to be located at a distance therefrom, a capillary tube connecting one of said springs with said bulb, a second capillary tube paralleling the first capillary tube and connected at one end with said second spring and having its other end extending into proximity to said bulb and sealed, a rotatable dial operatively connected with said first named spring, a movable index member adapted to cooperate with said dial and operatively connected with said second spring, and a front plate for the instrument having an opening therein permitting observation of a part of said dial and of said index member.

19. In an instrument of the character described the combination of a casing, duplicate Bourdon springs therein, a bulb adapted to be located at a distant point, a capillary tube connecting one of said springs with said bulb, a second capillary tube paralleling the first capillary tube and connected at one end with said second spring and having its other end extending into proximity with said bulb and sealed, rotatable arbors mounted axially of each of said Bourdon springs, a rotatable dial fixed to one of said arbors, a sleeve mounted on said arbor and freely rotatable thereon, an index member fixed on said sleeve and adapted to cooperate with said dial, a lever projecting from said sleeve, a lever projecting from the arbor of said second Bourdon spring, and a link connecting said levers.

20. An instrument for measuring temperature at a remote point comprising an index member, a dial member, means comprising a Bourdon spring for actuating one of said members in response to temperature variations at said point, and means comprising a Bourdon spring for actuating the other member to compensate for the effect of temperature variations between said instrument and said point, one of said means also comprising an element for compensating for the effect upon the instrument of temperature variations in proximity to same.

21. In an instrument of the character described the combination of two pressure-sensitive elements, indicating means controlled by the joint action of said elements, a bulb adapted to be located at a distant point, a capillary tube connecting one of said elements with said bulb, a second capillary tube connected with the second element and paralleling said first tube and extending into proximity to said bulb, but sealed at its end, and a single insulating sleeve enclosing both of said tubes.

22. In an instrument of the character described the combination of a pair of Bourdon springs each fixed at one end and filled with an expansible liquid, one of said springs being joined at its free end to the other spring intermediate the ends thereof, indicating means, and an operative connection between said second spring and said indicating means.

23. In an instrument of the character described the combination of two Bourdon springs each mounted at one end upon a fixed support, the free end of one of said springs being connected to a movable part of the other spring, indicating means operatively connected with said springs, a bulb adapted to be located at a distant point, and a tube connecting said bulb with the interiors of said springs.

24. In an instrument for measuring temperature variations, the combination of a pair of Bourdon springs arranged in parallel, a capillary tube, said springs each having one end made fast and communicating with said capillary tube thereat, and a movable part of the instrument, said springs being arranged to actuate said movable part of the instrument.

25. In an instrument for measuring temperature variations, the combination of an index member, a pair of Bourdon springs arranged in parallel and operatively connected to said index member, a capillary tube, said springs being fixed and communicating jointly with said capillary tube, a movable dial, and a second pair of Bourdon springs arranged in parallel and operatively connected to the dial, a second capillary tube said second springs communicating with said second capillary tube, said tubes being arranged adjacent each other and one of them being sealed at its outer end, and a bulb connected to the outer end of the other of said tubes.

26. In an instrument for measuring temperature variations the combination of a pair of Bourdon springs arranged in parallel, one spring being wound a number of turns in one direction, and a number of turns inside the first turns in the opposite direction and the second spring enveloping the first spring and joined to the latter at one end thereof

HERMAN SCHLAICH.